United States Patent [19]

Brabazon

[11] Patent Number: 4,685,156

[45] Date of Patent: Aug. 11, 1987

[54] ADJUSTABLE WATER TEMPERATURE SAFETY CONTROL UNIT

[76] Inventor: James A. Brabazon, Box 363, 148 County Hwy. S., Maiden Rock, Wis. 54750

[21] Appl. No.: 872,801

[22] Filed: Jun. 11, 1986

[51] Int. Cl.⁴ .................................. F16K 11/16
[52] U.S. Cl. ........................... 4/194; 137/597; 137/607; 137/865; 251/288
[58] Field of Search ............ 137/607, 595, 597, 865; 251/248, 285, 287, 288; 4/194

[56] References Cited

U.S. PATENT DOCUMENTS

| | | | |
|---|---|---|---|
| 903,354 | 11/1908 | Brown | 251/248 |
| 982,498 | 1/1911 | Hoffmann . | |
| 1,159,566 | 11/1915 | Brigel | 137/865 X |
| 1,378,141 | 5/1921 | Slater | 137/865 X |
| 1,479,545 | 1/1924 | Johnson . | |
| 1,551,226 | 8/1925 | Vallier . | |
| 1,615,730 | 1/1927 | Vallier | 137/597 X |
| 1,641,560 | 9/1927 | Whidden | 137/607 X |
| 1,912,295 | 5/1933 | Mintz | 137/607 |
| 2,180,790 | 11/1939 | Brummett . | |
| 2,575,305 | 11/1951 | Stryzakoski et al. . | |
| 2,706,492 | 4/1955 | Horland | 137/607 |
| 2,790,461 | 4/1957 | Lightfoot et al. | 137/865 X |
| 3,182,677 | 5/1965 | Thiem | 137/607 X |
| 3,222,690 | 12/1965 | Noakes | 4/194 |
| 3,275,036 | 9/1966 | Spencer . | |
| 3,314,082 | 4/1967 | Minella | 4/194 |
| 3,721,261 | 3/1973 | Martinez . | |
| 3,884,258 | 5/1975 | Mull . | |
| 4,013,094 | 3/1977 | Niskanen | 137/597 |
| 4,089,347 | 5/1978 | Christo | 251/285 X |
| 4,387,880 | 6/1983 | Saarisalo et al. . | |

Primary Examiner—Martin P. Schwadron
Assistant Examiner—Stephen M. Hepperle
Attorney, Agent, or Firm—Merchant, Gould, Smith, Edell, Welter & Schmidt

[57] ABSTRACT

An adjustment water temperature safety control unit (40) includes a pair of control valves (42, 44) interconnected by meshed control gears (100, 106) for opposite inversely proportional actuation responsive to a single control knob (78). The desired maximum hot water temperature and/or the desired minimum cold water temperature can be set by means of adjustable clips (104, 110) on the gears (100, 106), which are located behind a removable panel (26). Volumetric flow rate of the mixture is controlled by at least one valve (56) and control knob (64).

10 Claims, 8 Drawing Figures

ADJUSTABLE WATER TEMPERATURE SAFETY CONTROL UNIT

TECHNICAL FIELD

The present invention relates generally to a water temperature safety control for a bathtub and/or a shower unit. More particularly, this invention relates to a single handle hot/cold water temperature control that can be adjusted to limit both the maximum hot water temperature and/or minimum cold water temperature as desired for safety purposes.

BACKGROUND ART

Most households include water heaters to supply hot water for bathing and washing purposes. Such water heaters are typically adjustable to provide hot water at the desired temperature. Hotter water is usually desired for washing than for bathing. Many automatic dish washers and clothes washers require water heated to a particular temperature for proper operation. Thus, the water temperature required for clothes or dish washing is usually the controlling factor in setting the water heater.

Adjustment of the water temperature as desired for bathing and the like is simply accomplished by the user at the sink, tub or shower. Some attention is required because, in some cases, it is possible to become scalded, particularly if the water heater is positioned nearby or the supply lines are insulated, and there has been little or no temperature loss in line from the water heater. This can result in burns from scalding hot water, which of course is a dangerous condition. Excessive splashing can also occur if the volumetric flow rates of the hot water and cold water are not adjusted properly. These have been long standing problems associated with the use of water heaters that provide hot water for both bathing and washing.

Various non-scalding water valves have been developed heretofore, however, there have been several drawbacks to these prior devices. For example, U.S. Pat. Nos. 1,479,545 to Johnson; 1,551,226 and 1,615,730 to Vallier; 2,180,790 to Brummett; and 4,089,347 to Christo are representative of the prior art. One drawback has been that the prior devices have tended to be relatively complicated and thus expensive. Another drawback has been that the prior water temperature control devices have been adapted primarily for controlling only the hot water, and not the cold water as well. It will be appreciated that an unexpected blast of cold water can be a shock which could in turn cause the user to slip and fall in the tub and shower.

Yet another drawback with the prior water temperature control devices has been their lack of convenient adjustability. For example, U.S. Pat. No. 4,387,880 to Saarisalo shows a single-grip mixing valve that provides adjustability of either hot or cold temperature limits, but requires disassembly for adjustment.

Heretofore there has not been available a water temperature control safety unit of inexpensive construction that delivers a substantially constant volume of water within a preselected temperature range whose upper and lower limits can readily be adjusted as desired.

SUMMARY OF INVENTION

The present invention comprises an adjustable water temperature safety control unit which overcomes the foregoing and other difficulties associated with the prior art. In accordance with the invention, there is provided an apparatus for mixing two streams of liquid, such as hot water and cold water, and controlling their relative proportions so as to provide a mixture of substantially constant flow rate within a safe temperature range whose upper and lower limits can readily be adjusted as desired. The adjustable water temperature safety control unit of the invention comprises a pair of control valves, one being connected in the cold water supply line and the other being connected in the hot water supply line. The control valves are interconnected for inverse operation by control gears. Each control valve is preferably adapted to operate between fully open and fully closed positions over about one complete revolution. The gears, which are preferably the same size, are enmeshed in a 1:1 inverse drive ratio so that closure of one control valve opens the other control valve proportionately in order to maintain substantially constant volumetric flow rate. A single control knob is also secured to the valve stem of one of the control valves. Removable clips are provided for attachment to the control gears for purposes of limiting the minimum and maximum water temperatures as desired. The outlets of the control valves are connected to a fitting, wherein the hot water and cold water are combined into a mixture at the desired temperature, and at least one on/off shut-off valve is connected to the outlet of the fitting for controlling volumetric flow rate of the mixture delivered to the tub, shower, sink, or the like.

BRIEF DESCRIPTION OF DRAWINGS

A better understanding of the invention can be had by reference to the following Detailed Description in conjunction with the accompanying Drawings wherein.

DETAILED DESCRIPTION

Figure 1:
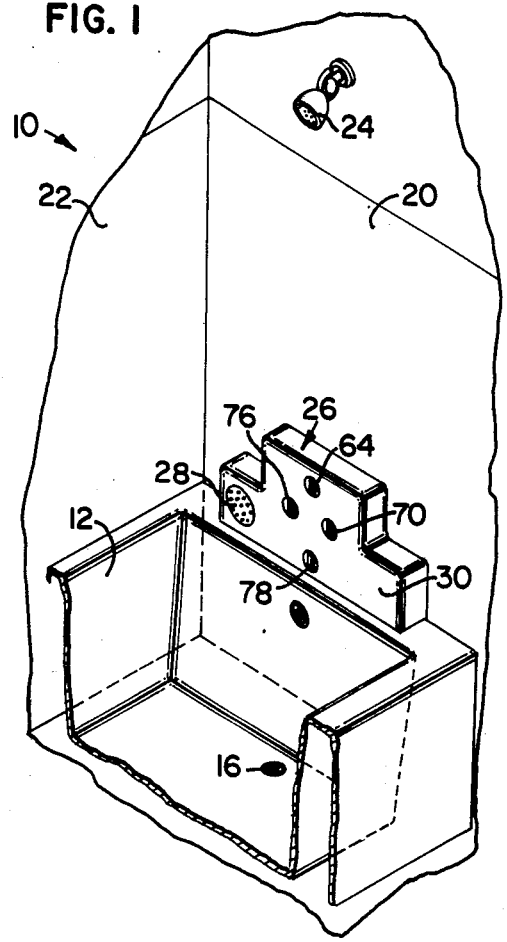
FIG. 1 is perspective cutaway view of a portion of a tub and shower enclosure incorporating the adjustable water temperature safety control unit of the invention.
Figure 2:
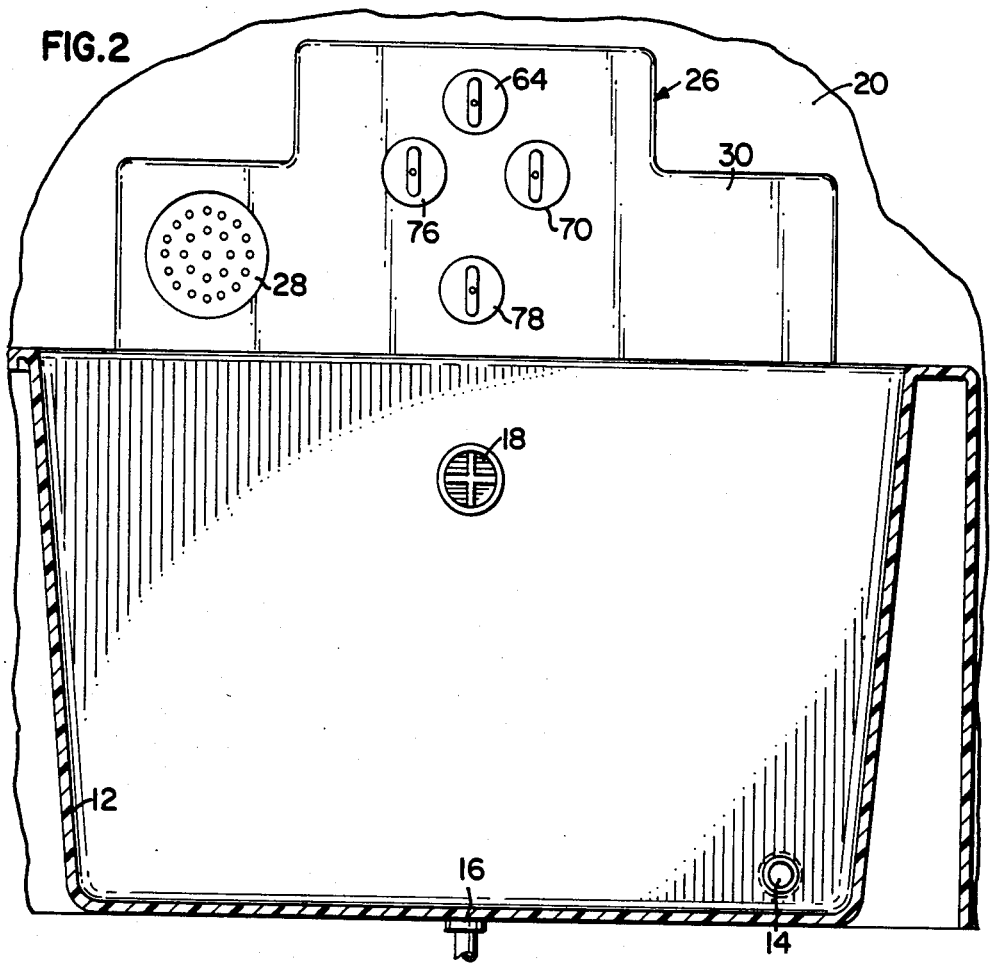
FIG. 2 is an enlarged front view of a portion of the tub and shower enclosure of FIG. 1.

Referring now to the Drawings, wherein like reference numerals designate like or corresponding elements throughout the views, and particularly referring to FIGS. 1 and 2, there is shown a tub and shower enclosure 10 incorporating the water temperature safety control unit of the invention. The tub and shower enclosure 10 includes a tub 12 having a fill port 14, floor drain 16 and an overflow drain 18. The fittings comprising the fill port 14, floor drain 16 and overflow drain 18 are preferably flush with the bottom and side walls of the tub 12 so as to avoid any projections that could cause or further possible injury in the event of a fall in the tub. The tub 12 is surrounded by a front wall 20, side wall 22 and a rear wall (not shown) which can be of either separate or integral construction so as to form a watertight enclosure about three sides of the tub. A shower head 24 is provided in the front wall 20. A recessed panel 26 is also provided in the front wall 20, adjacent to the flanged upper edge of the tub 12. The panel 26 is preferably recessed substantially flush with the front wall 20 and includes various recessed controls therein so as to avoid any projections that could cause or contribute to further possible injury in the event of a slip and fall in the tub and shower enclosure 10. A retractable rinse head 28 is located on one side of the panel 26, while a storage cabinet 30 can be provided on the other side for convenient storage of soap, shampoo, wash cloths and the like.

As will be explained more fully hereinafter, the adjustable water temperature safety control unit of the invention is connected between the hot and cold water supply lines behind wall 20 to provide water within a safe temperature range to the discharge outlets in the enclosure.

Figure 3:
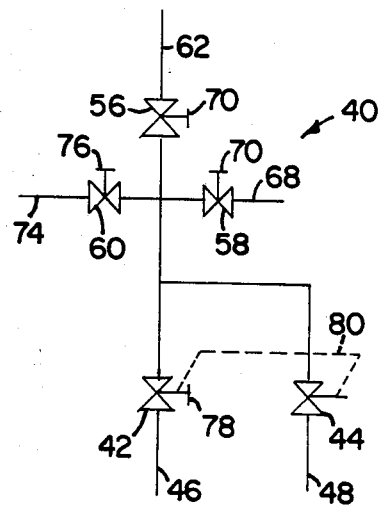
FIG. 3 is a schematic diagram of the adjustable water temperature safety control unit incorporating a first embodiment of the invention.
Figure 4:
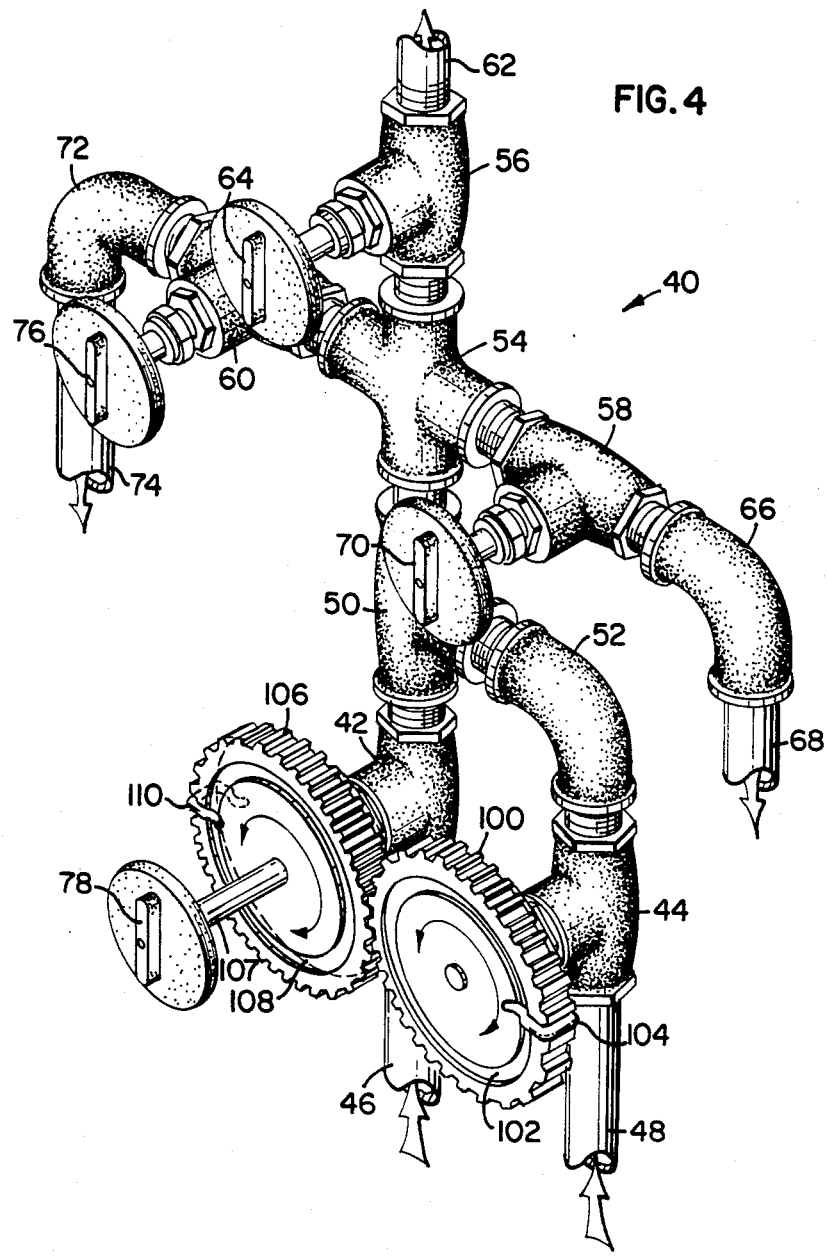
FIG. 4 is an enlarged perspective view of the water temperature safety control unit of the first embodiment.

Referring now to FIGS. 3 and 4, there is shown the adjustable water temperature safety control unit 40 incorporating the first embodiment of the invention. The control unit 40 includes a pair of mixing control valves 42 and 44. As illustrated, the control valve 42 is connected to the hot water supply line 46 while the control valve 44 is connected to the cold water supply line 48, although the positions of the valves could be reversed if desired. The outlet of the control valve 42 is connected to a T-fitting 50 while the outlet of the control valve 44 is connected through an elbow fitting 52 to the T-fitting, wherein mixing of the streams of hot and cold water occurs.

At least one shut-off valve is connected to the outlet of the T-fitting 50 for controlling the volumetric flow rate of the water mixture. As illustrated, a cross over fitting 54 is connected to the outlet of the T-fitting 50. Shut-off valves 56, 58 and 60 are connected to the outlets of the cross over fitting 54. The valve 56 is connected between fitting 54 and a line 62 leading to the shower head 24, which is controlled by a recessed knob 64 in the panel 26. The valve 58 connects the cross over fitting 54 with an elbow 66 and a line 68 leading to the tub fill port 14, which is controlled by another recessed knob 70 in the panel 26. Similarly, valve 60 connects the fitting 54 with another elbow 72 and a line 74 leading to the retractable rinse head 28, which is controlled by a recessed knob 76 in the panel 26.

Figure 5:
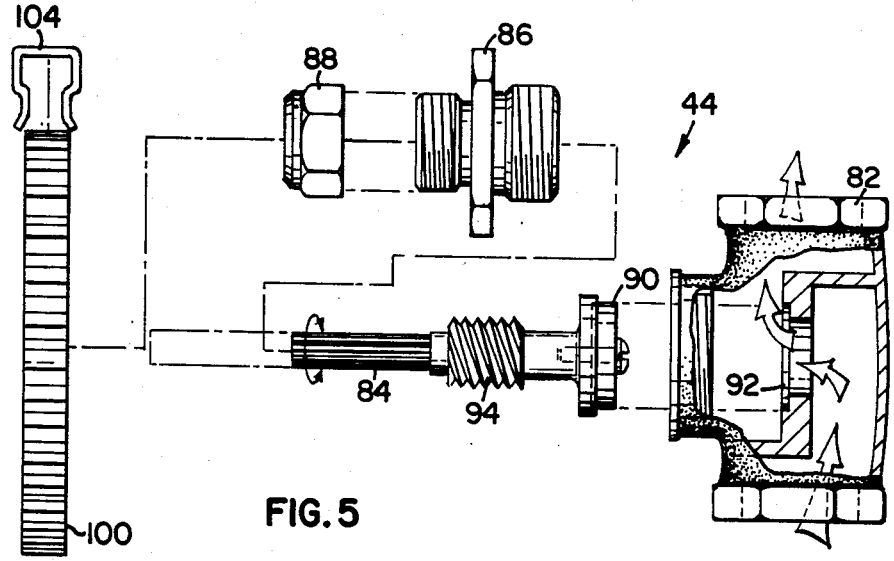
FIG. 5 is an exploded view of one of the control valves.

Referring now to FIG. 5 in conjunction with FIGS. 3 and 4, the control valves 42 and 44 are interconnected for opposite or inversely proportional actuation responsive to a single recessed temperature control knob 78 which is also provided in the panel 26. The dotted line 80 in FIG. 3 represents the fact that control valves 42 and 44 are interconnected for common actuation. In particular, the control valves 42 and 44, which are of similar construction, are preferably adapted for actuation between fully open and fully closed positions over one 360° revolution. For example, the control valve 44, which is shown in exploded view in FIG. 5, includes a valve body 82, a stem 84, a cap 86, and a stem packing cap 88. The inner end of the valve stem 84 includes a washer 90 which is movable with the valve stem into and out of engagement with the valve seat 92 in the body 82. The valve cap 86 in turn is threaded into the side of the valve body 82, and the valve stem 84 is threaded through the valve cap by means of double lead threads 94 so as to provide fully open or fully closed positions of the valve 44 over one complete 360° revolution. The stem packing cap 88 in turn slides over the outer end of the valve stem 84 and screws onto the valve cap 86. Control gear 100 is press-fitted onto the splined valve stem 84. Circular grooves 102 are provided on the faces of control gear 100, and a removable clip 104 is secured at the desired position about the gear. Clip 104, as is best seen in FIG. 5, includes converging leg portions for snapping into grooves 102.

The control valve 42 is of similar construction except that another control gear 106 is connected to stem 107, which is longer than valve stem 84, as indicated in phantom lines in FIG. 5, so as to protrude through panel 26. Control gear 106 includes similar circular grooves 108 and a removable clip 110 thereon. The control gear 106, which is in meshed engagement with the gear 100, is also connected to the recessed knob 78 in the panel 26. Gears 100 and 106 can be made from molded plastic or other suitable material, and are preferably of the same size.

Actuation of the temperature control knob 78 causes one of the valves 42 and 44 to open as the other closes, and vice versa, such that hot water and cold water are mixed in inverse proportions. To set the temperature, the control gear 106 would be turned clockwise to its limit so that the hot water supply line 46 would be fully closed and the cold water supply line 48 would be fully open. One of the valves 56, 58 or 60 would then be opened until obtaining the desired water flow. The control valve 106 would then be turned counterclockwise until reaching the desired maximum hot water temperature, whereupon the clip 110 would then be pressed onto the control gear 106 adjacent the mesh points between gears 100 and 106 so as to limit further counterclockwise (opening) actuation of the control valve 42. The knob 78 would then be rotated clockwise to close the hot water control valve 42 and open the cold water control valve 44 until reaching the desired minimum cold water temperature, whereupon the clip 104 would then be pressed onto the control gear 100 near the mesh point between gears 100 and 106 to limit further clockwise movement of the temperature control knob 78.

Although limit clips 104 and 110 are shown mounted on different gears 100 and 106, both clips could be mounted on the same gear if desired, depending upon the dersired temperature range. Further, only one of the limit clips 104 and 110 can be used if it is desired to limit only maximum hot water temperature, or only minimum cold water temperature, but not both.

Figure 6:
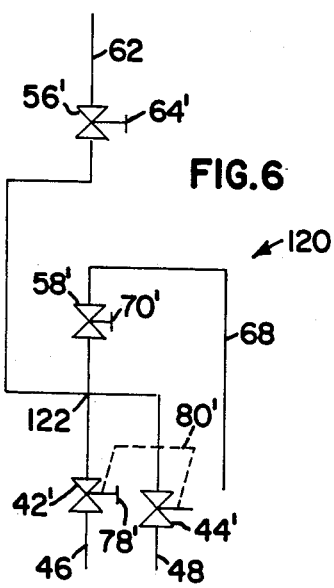
FIG. 6 is a schematic diagram of an adjustable water safety control unit incorporating a second embodiment of the invention.
Figure 7:
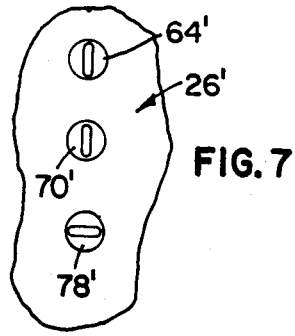
FIG. 7 is a view of the control panel of the second embodiment.
Figure 8:
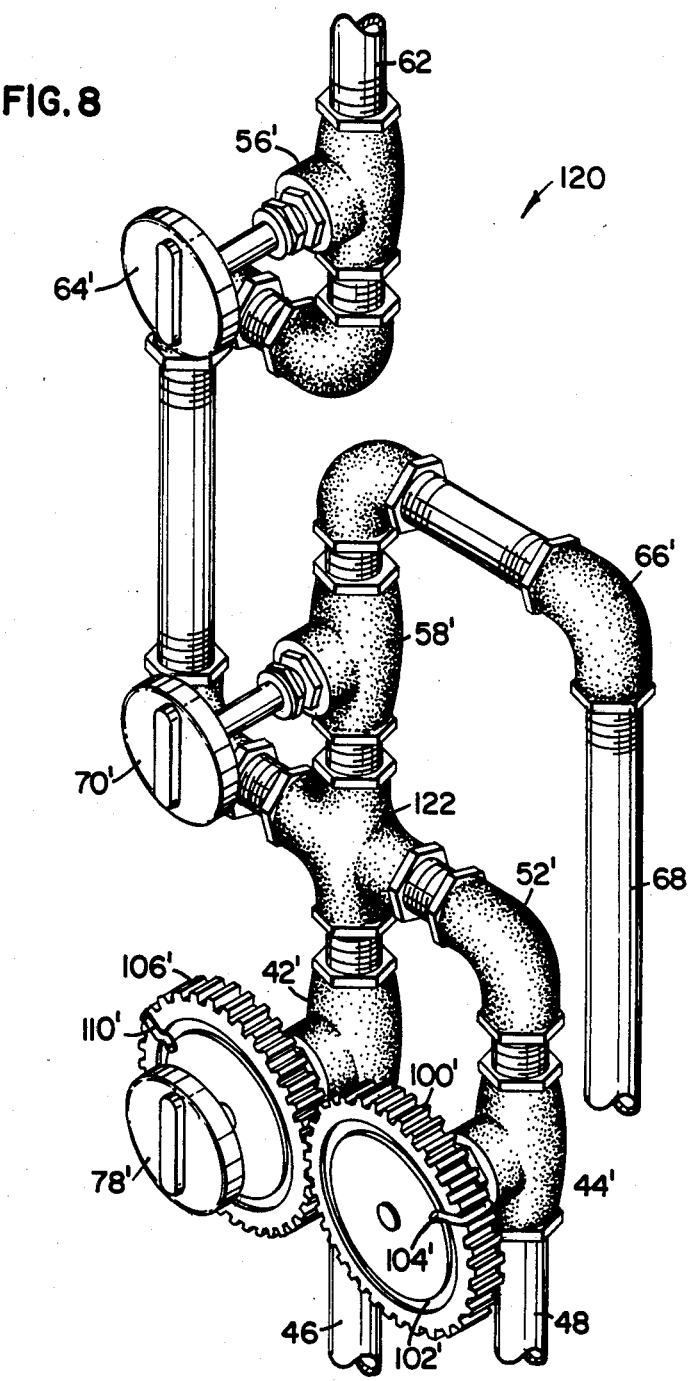
FIG. 8 is an enlarged perspective view of the water temperature safety control unit of the second embodiment.

FIGS. 6-8 illustrate a second embodiment of the water temperature safety control unit 120 of the present invention. The water temperature safety control unit 120 of the second embodiment incorporates numerous component parts which are substantially identical in construction and operation to certain component parts of the control unit 40 of the first embodiment. Such component parts in the second embodiment have been identified with the same reference numerals from the first embodiment, but have been differentiated therefrom by means of prime (') notations. The primary difference between the control units 120 and 40 comprises the fact that the unit 120 is of more compact construction, such as for use in mobile homes, for example, with only two shut-off valves for the tub and shower. In place of the T-fitting 50 of the control unit 40, the control unit 120 utilizes a cross over fitting 122 between the outlets of the control valves 42' and 44' and the inlets of the on/off valves 56' and 58'. Otherwise, the water temperature safety control unit 120 of the second embodiment is substantially the same in construction and operation as the first embodiment herein.

From the foregoing it will thus be apparent that the present invention comprises an improved adjustable water temperature safety control unit having numerous advantages over the prior art. The unit herein provides for convenient adjustability of either the maximum hot water temperature or the minimum cold water temperature, or both, as well as maintaining uniform volumetric flow rate of the mixture subject to control by an independent on/off shut-off valve. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. An adjustable water temperature control for connection between hot and cold water supply lines and a discharge outlet, which comprises:
   a pair of control valves, one control valve being connected in the hot water supply line and the other control valve being connected in the cold water supply line;
   each control valve being operable to the same extent between open and closed positions;
   means interconnecting said control valves for inverse simultaneous operation over a limited adjustable range in at least one direction for mixing the hot and cold water to the desired temperature in the range; and
   a shut-off valve connected between said control valves and the discharge outlet for controlling flow rate;
   said means interconnecting said control valves including:
   a pair of gears, one being connected to one control valve and the other being connected to the other control valve;
   said gears being meshed together for rotation in opposite directions;
   a manual control knob connected to one of said gears; and
   means removably secured to one said gears for interfering engagement with the other gear to limit rotation of said gears in the said one direction.

2. The adjustable water temperature control according to claim 1, wherein said means removably secured to one of said gears comprises a peripheral clip.

3. The adjustable water temperature control according to claim 2, further including:
   another peripheral clip removably secured to one of said gears to limit rotation of said gears in the other direction.

4. An adjustable water temperature control for connection between hot and cold water supply lines and a discharge outlet, which comprises:
   a pair of control valves, one being connected in the hot water supply line and the other being connected in the cold water supply line;
   each control valve including a valve stem and being operable to the same extent between open and closed positions;
   a pair of gears, one gear being secured to the valve stem of one control valve and the other gear being secured to the valve stem of the other gear;
   said gears being in meshed engagement to interconnect said control valves for predetermined proportional inverse simultaneous operation;
   means associated with said gears for limiting rotation thereof in at least one direction;
   a manula temperature control knob secured to the valve stem of one of said control valves; and
   a manual flow control vlave connected between said control valves and the discharge outlet for controlling flow rate of the hot and cold water mixture;
   said limiting means including a peripheral clip removably secured to one of said gears.

5. The adjustable water temperature control according to claim 4, further including:
   another peripheral clip removably secured to one of said gears for interference with the other gear to limit rotation of said gears in the opposite direction.

6. The adjustable water temperature control according to claim 4, wherein opposite faces of said gears include circular grooves therein, and wherein each clip includes complementary leg portions for snap-releasable attachment to said gears.

7. An adjustable water temperature control for connection between hot and cold water supply lines and a discharge outlet, which comprises:
   a first control valve connected in the hot water supply line,
   said first valve being operable between open and closed positions;
   a second control valve connected in the cold water supply line, said second control valve being operable between open and closed positions;
   a first gear connected to said first control valve;
   a second gear connected to said second control valve, said first and second gears being in meshed engagement to interconnect said first and second control valves for predetermined inverse but equal operation;
   a first removable clip peripherally secured to said first gear for interference with said second gear to limit relative opening and closing of said control valves in one direction;
   a second peripheral clip removably secured to said second gear for limiting relative opening and closing of said second valve in the other direction;
   a manual temperature control knob attached to one of said first and second gears for controlling proportional mixtures of the hot water and cold water; and
   a manual flow control valve connected between said first and second control valves and the discharge outlet for controlling flow rate of the hot and cold water mixture.

8. The adjustable water temperature control of claim 9, further including:
   a tub including bottom and side walls;
   means defining a flush floor drain in the bottom wall of said tub;

means defining a flush overflow drain in the wall of said tub; and means defining a flush fill port in the wall of said tub, said fill port being connected to the discharge outlet.

9. The adjustable water temperature control according to claim 8, further including:

means including a wall defining a water-tight enclosure about part of said tub;

a panel provided in said wall; and a manual flow control knob attached to said flow control valve;

said control temperature and flow knobs being recessed in said panel.

10. The adjustable water temperature control of claim 7, further including:

a tub including bottom and side walls;

means defining a flush floor drain in the bottom wall of said tub;

means defining a flush overflow drain in the side wall of said tub;

means defining a flush fill port in the wall of said tub, said fill port being connected to the discharge outlet;

a shower head mounted in spaced relation above said tub;

a fitting connected between said manual flow control valve and said first and second valves; said fitting including an outlet; and another manual flow control valve connected between the outlet of said fitting and said shower head.

* * * * *